United States Patent [19]

Ku et al.

[11] 4,051,692

[45] Oct. 4, 1977

[54] COOLING APPARATUS FOR AUTOMOBILE PASSENGER COMPARTMENT

[76] Inventors: Paul Ku; Irene Lau Ku, both of 47-50 59th St., Apt. 6E, Woodside, N.Y. 11377

[21] Appl. No.: 731,659

[22] Filed: Oct. 12, 1976

[51] Int. Cl.[2] .................... B60H 3/04; F25D 17/04; F28D 5/00
[52] U.S. Cl. ................................ 62/244; 62/309; 62/310
[58] Field of Search ............... 62/309, 310, 244, 323; 261/DIG. 4

[56] References Cited

U.S. PATENT DOCUMENTS

| 2,258,725 | 10/1941 | Wikinson | 62/244 |
| 2,488,116 | 11/1949 | Berlowitz | 62/310 |
| 2,541,861 | 2/1951 | Chambers | 62/310 |
| 2,929,223 | 3/1960 | Joachim, Jr. | 62/309 |
| 2,970,456 | 2/1961 | Rice | 62/310 |
| 4,003,312 | 1/1977 | Kinsell et al. | 62/244 |

Primary Examiner—Lloyd L. King

[57] ABSTRACT

Apparatus for cooling vehicles which includes a cylindrical housing having a side wall opening and an open top, a conduit and pump connected to the bottom of said circular housing for pumping liquid from said housing to at least one heat exchanger, a heat exchanger located in the passenger compartment of the vehicle, a spray head in the open top of said housing and conduit means for feeding fluid from the heat exchanger to the spray head, the liquid discharged through said spray head being cooled, by evaporation, by air flowing through said housing, said cooled liquid, when pumped through said heat exchanger, cooling the passenger compartment of the vehicle.

8 Claims, 2 Drawing Figures

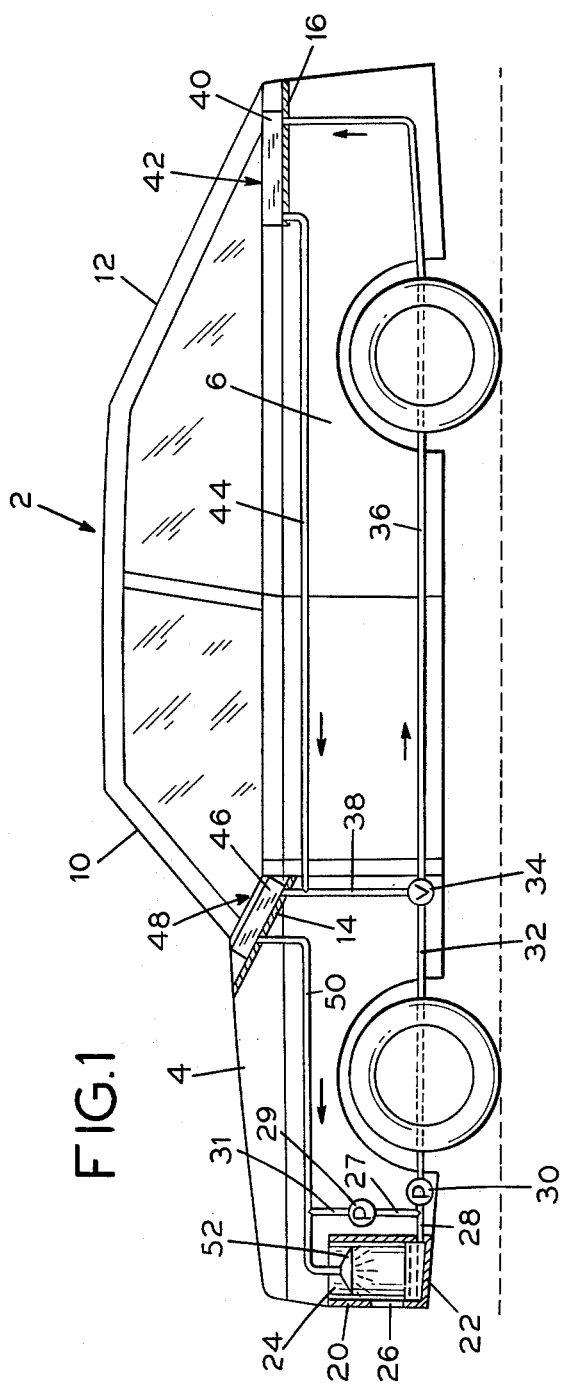
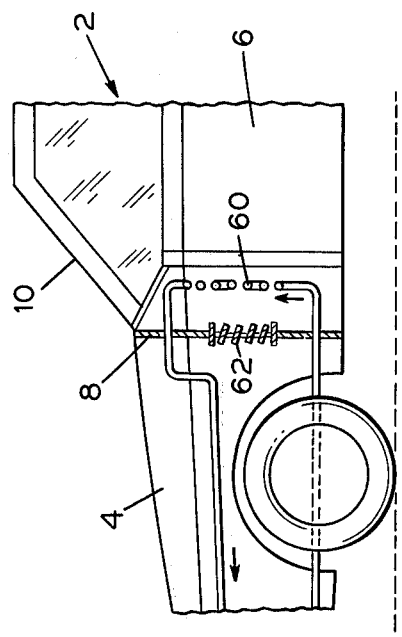

COOLING APPARATUS FOR AUTOMOBILE PASSENGER COMPARTMENT

This invention relates to apparatus for cooling vehicles and, more particularly, to apparatus for cooling the passenger compartment of a conventional automobile.

The use of air-conditioners for cooling the passenger compartment of conventional automobiles has, in recent years, found extensive use. Air-conditioners most commonly employed for such vehicles include compressors, condensers, fans and a variety of other components which make such air-conditioners relatively large, relatively expensive and substantially reduce the gasoline of fuel mileage of vehicles in which such air-conditioners are installed. When such fuel was abundant and relatively inexpensive, reduction in fuel mileage was not considered a detriment to the use of such air-conditioners. Now, however, fuel has become less abundant and, at times, available in only limited quantities. When available, fuel costs have substantially increased. Thus, reductions in fuel mileage have become of paramount importance. These and other difficulties heretofore encountered in the cooling of the passenger compartment of automobiles are overcome in the instant invention. This is accomplished at relatively low cost and by relatively simple construction.

In the instant invention, the vehicle passenger compartment is cooled by circulating through one or more heat exchangers located in the passenger compartment of liquid medium cooled as the vehicle is driven forwardly. Such cooling of the liquid medium is accomplished by spraying such liquid into an air stream resulting from the vehicle forward motion. The liquid and air stream are in counter-flow and, after moving through such air stream, the liquid is collected and pump through the heat exchangers in the passenger compartment. As the sprayed liquid moves through the air stream, a relatively small amount of the liquid is evaporated and, by such evaporation, the liquid which remains is cooled. From time to time, the liquid in the system is supplemented. Preferably, this is done after the vehicle has been used and before the next use. Where use of the vehicle is continuous, the liquid used in the instant invention may be supplemented during refueling of the vehicle. Because, as will be later explained, the preferred liquid is water, supplementing the liquid during refueling is relatively easy.

The invention of the present application will be more fully understood from the following description and drawings of preferred embodiments of the invention in which FIG. 1 is a side view, partly in section, of one embodiment of the invention; and FIG. 2 is a partial side view, partly in section, of a second embodiment of the invention.

Referring to FIG. 1 of the drawings, the passenger vehicle, generally designated 2, is conventional and includes an engine compartment 4 and passenger compartment 6, separated by fire wall 8, FIG. 2. The front end of passenger compartment 6, has a windshield 10 and the rear end of the compartment has a window 12. Windshield 10 and 12 are transparent glass and, in the conventional manner, are of the safety glass type.

Passenger vehicle 2 is provided, in conventional manner, with seats, not shown, and at the front end of the passenger compartment 6 with a dashboard 14 and at the rear end with a shelf 16. Dashboard 14 and shelf 16 extend across the vehicle in, substantially, horizontal planes. The top surfaces of dashboard 14 and shelf 16 are normally exposed to sun rays, passing through windshield 10 and rear window 12, respectively, which sun rays, especially when the vehicle is parked in the sun, raise the temperatures of the dashboard and shelf surfaces substantially.

In the embodiment of the present invention illustrated in FIG. 1, cylindrical housing 20, having a closed bottom 22, an open top 24 and a forwardly facing side wall opening 26 is fixedly mounted, in engine compartment 4, forwardly of the engine, not shown, with side wall opening 26 facing in the direction of vehicle travel when the vehicle is driven in its normal forward direction. Housing 20 may be mounted in front or in back of the front vehicle grill or might be designed into such grill. In any event, for reasons which will be more apparent later herein, air flow through side wall opening 26 and out of housing 20 through open top 24 should not be impaired.

Bottom 22 of housing 20, below side wall opening 26, is connected by conduits 27, 28, to pumps 29, 30, respectively. Pump 29 is connected by conduits 31 to spray head 52. Pump 30 is connected by conduit 32 to valve 34. For reasons more apparent hereinafter, valve 34 is a two-way valve which, in one position, connects conduit 32 to conduit 36 and, in its other position, connects conduit 32 to conduit 38. Conduit 36 is connected to the inlet end of tank 40 of heat exchanger, generally designated 42, mounted in a substantially horizontal position across the top of shelf 16 and extending across shelf 16 and across the width of passenger compartment 6. The outlet end of tank 40 of heat exchanger 42 is connected by conduit 44 to conduit 38 connected to the inlet end of tank 46 of heat exchanger, generally designated 48, mounted in a substantially horizontal position across the top of dashboard 14. Heat exchanger 48 extends across dashboard 14 and across the width of passenger compartment 6. The outlet end of tank 46 of heat exchanger 48 is connected by conduit 50 to spray head 52 mounted in the top of cylindrical housing 20.

The apparatus of FIG. 1 cools passenger compartment 6 of vehicle 2 by circulating a liquid, sprayed and cooled by evaporation in cylindrical housing 20, through heat exchanger 48, alone, or through both heat exchangers 42, 48. Valve 34 may be manually turned to selectively circulate the cooled liquid through heat exchanger 48 or through both heat exchangers. The liquid is pumped by pumps 29, 30 which may be driven by a 12 volt D.C. electric motor. Two 1.5 Amp. pumps have been found to be satisfactory and are the only components in the system which requires power. The cooled liquid, as it passes through the heat exchangers absorbs and removes the heat from the passenger compartment. The liquid is, itself, re-cooled by evaporation in housing 20 and is recirculated. In the practice of the instant invention, water has been found to be readily available and a suitable liquid which the required evaporation characteristics for use in the apparatus. Other liquids might also be used.

The apparatus of the instant invention is particularly suited for use in sunlight where the vehicle dashboard and rear shelf are exposed through the windshield and rear window, respectively, to sunlight and, from such sunlight, absorb and radiate heat into the interior of the passenger compartment. With outside ambient air temperature at 79° F. on a sunny day, the inside of the passenger compartment of a vehicle, standing in the sunlight with the windows closed, may reach 117° F. or higher. It is to the cooling of such a vehicle that the apparatus of the instant invention is particularly directed.

Utilizing a housing 20 having a diameter of 8 inches with a side wall opening 26 also of 8 inches, the cooling capacity of the apparatus of instant invention was tested on a sunny day when the outside ambient temperature was 73° F. and the wet bulb temperature was 60° F. The water capacity of the system was 240 oz. or 15.88 pounds. The water was circulated through the system by pump 30 at the rate of 2 gallons per minute and the vehicle was driven at a speed of 30 miles per hour. With a water temperature of 115° F. at the start of the test, after 10 minutes of water circulation and driving of the car at 30 miles per hour the water temperature was reduced to 85° F. and, after 20 minutes to 75° F. In a second test of the same size system with the same amount of water and the vehicle driven at the same speed but with the starting temperature of the water at 73° F., after 10 minutes of driving, the water temperature was reduced to 67° F., after 20 minutes to 64° F. and, after 30 minutes to 61° F.

At the higher temperature of 115° F. which, in the sunlight at the ambient outside temperature of 73° F., is the approximate inside temperature of the closed passenger compartment of a vehicle parked in the sun and would be the approximate temperature of the liquid in the heat exchangers and in the system and the temperature from which the passenger compartment is to be initially cooled, at the vehicle speed of 30 miles per hour, the apparatus tested has a cooling capacity of 2858 B.T.U. per hour for each cylindrical housing.

A heat exchanger, having an exposed surface of 5.05 square feet, when mounted above the dashboard and with the vehicle driven toward the sun and the sun rays striking the surface of the heat exchanger was found to absorb 1152 B.T.U. per hour when such vehicle was driven with the vehicle windows closed and 1056 B.T.U. per hour when driven with the windows open. With heat exchangers, each having an exposed surface of about 5 square feet, mounted on the top of the dashboard and on top of the rear shelf and both being connected to an 8 inch evaporation housing in the arrangement shown in FIG. 1 and utilized in the tests described, the B.T.U. capacity of the evaporation cooling system, i.e., two tanks each having a capacity of 1152 B.T.U., is more than adequate for the B.T.U.'s absorbed by the two heat exchangers.

For a medium size car, it is estimated that a heat transfer of about 4000 B.T.U. per hour from the passenger compartment should be sufficient to maintain the passenger compartment reasonably comfortable. At such capacity the theoretical water consumption because of cooling evaporation is calculated to be about 4 pounds or one-half gallon per hour. Actual tests have shown the consumption to be about 12 pounds or one and one-half gallons per hour.

In the embodiment of the invention illustrated in FIG. 1 and heretofore described and tested, the heat exchangers are mounted on the dashboard and rear shelf. Such heat exchanger might also be mounted in the ventilation system, such as shown at 60 in FIG. 2. In such arrangement outside air flows through louvers 62, which may be adjustable, and across cooling coil 60. By adjusting the louvers 62, cooling of vehicle compartment 6 might be regulated. The embodiments of FIGS. 1 and 2, each as an independently operated system, may be combined in a single vehicle for use where prevailing temperatures are high or where higher total cooling capacity is desired. The only power required in such system would be four 1.5 Amp. 12 volts D.C. motor driven pumps.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A cooling unit for the passenger compartment of a vehicle for cooling such passenger compartment while said vehicle is driven in a forward direction said cooling unit including a vertical body having an air inlet opening, an air outlet opening and an air passageway for moving air entering said body through said air inlet opening through an upward vertical path and out said outlet opening, means adjacent said outlet opening for spraying an evaporatable liquid downwardly through said vertical path through said upwardly moving air, means for catching said liquid sprayed downwardly after said liquid has passed downwardly through said upwardly moving air and pumping means for circulating said liquid from said catching means, through said passenger compartment to said spraying means, said pump circulating means in said passenger compartment including heat exchanger means whereby said liquid passing through said heat exchanger means and cooled by evaporation as said liquid is sprayed downwardly through said upwardly moving air cools the air in the passenger compartment.

2. A cooling unit, as recited in claim 1, in which said spraying means is a spray head.

3. A cooling unit, as recited in claim 2, in which said spray head sprays said liquid downwardly in a pattern extending substantially across the full cross-section of said upward vertical air path.

4. A cooling unit, as recited in claim 3, in which said heat exchanger is a pipe coil.

5. A cooling unit, as recited in claim 4, in which said pipe coil is a tank mounted in substantially a horizontal plane along the top surface of the dashboard where said dashboard is exposed to sun rays through the windshield of the vehicle passenger compartment.

6. A cooling unit, as recited in claim 5, in which said tank is mounted in substantially a horizontal plane along the top surface of the shelf at the rear of the passenger compartment where such shelf is exposed to sun rays through the rear window of the vehicle passenger compartment.

7. A cooling unit, as recited in claim 3, in said heat exchanger includes a first tank mounted in substantially horizontal plane along the top surface of the shelf at the rear of the passenger compartment and a second tank mounted in substantially a horizontal plane along the top surface of the dashboard, said pumping circulating means in said passenger compartment including means for pumping said liquid from said catching means through said first tank, then through said second tank and, from said second tank, to said spraying means.

8. A cooling unit as recited in claim 4 including louvres for controlling air flow across said pipe coil.

* * * * *